US012700610B2

(12) United States Patent
Cho et al.

(10) Patent No.: US 12,700,610 B2
(45) Date of Patent: Aug. 4, 2026

(54) DEVICE FOR MANUFACTURING ELECTRODE

(71) Applicant: EO TECHNICS CO., LTD., Anyang-si (KR)

(72) Inventors: Kyung Deok Cho, Ansan-si (KR); Young Deok Nam, Seongnam-si (KR)

(73) Assignee: EO TECHNICS CO., LTD., Anyang-si (KR)

( * ) Notice: Subject to any disclaimer, the term of this patent is extended or adjusted under 35 U.S.C. 154(b) by 627 days.

(21) Appl. No.: 18/343,644

(22) Filed: Jun. 28, 2023

(65) Prior Publication Data

US 2024/0006648 A1 Jan. 4, 2024

(30) Foreign Application Priority Data

| | | |
|---|---|---|
| Jul. 4, 2022 | (KR) | 10-2022-0082113 |
| Oct. 27, 2022 | (KR) | 10-2022-0140555 |
| Jan. 9, 2023 | (KR) | 10-2023-0002909 |

(51) Int. Cl.
*H01M 10/04* (2006.01)
*B23K 26/142* (2014.01)
(Continued)

(52) U.S. Cl.
CPC ....... *H01M 10/0404* (2013.01); *B23K 26/142* (2015.10); *B23K 26/38* (2013.01); *B23K 2101/38* (2018.08)

(58) Field of Classification Search
CPC .. H01M 10/0404; H01M 4/04; B23K 26/142; B23K 26/38; B23K 2101/38; Y02E 60/10
See application file for complete search history.

(56) References Cited

U.S. PATENT DOCUMENTS

2007/0241086 A1* 10/2007 Arao ....................... H10P 14/24
219/121.84

FOREIGN PATENT DOCUMENTS

| | | |
|---|---|---|
| CN | 107160036 A | 9/2017 |
| JP | 2015-51447 A | 3/2015 |

(Continued)

OTHER PUBLICATIONS

Notice of Allowance for KR10-2022-0082113 by Korean Intellectual Property Office dated Jul. 30, 2024.

(Continued)

*Primary Examiner* — Robert G Bachner
(74) *Attorney, Agent, or Firm* — BROADVIEW IP LAW, PC

(57) ABSTRACT

An electrode manufacturing device is disclosed. The electrode manufacturing device includes a transfer unit configured to transfer an electrode, a laser output unit configured to emit a laser beam to the electrode, a guide unit including a first surface and a second surface for guiding the electrode so that the electrode is transferred along a preset path while the laser beam is emitted, and a cleaning unit disposed adjacent to the guide unit, and configured to remove dust deposited on the guide unit, wherein the guide unit rotates between a first state and a second state, in the first state, the first surface is disposed to guide the electrode and the second surface is disposed to be cleaned by the cleaning unit, and in the second state, the first surface is disposed to be cleaned by the cleaning unit and the second surface is disposed to guide the electrode.

18 Claims, 9 Drawing Sheets

(51) Int. Cl.
    *B23K 26/38*     (2014.01)
    *B23K 101/38*     (2006.01)

(56)           References Cited

FOREIGN PATENT DOCUMENTS

| KR | 10-2158708 | B1 | 9/2020 |
| KR | 10-2021-0093603 | A | 7/2021 |
| KR | 10-2343184 | B1 | 12/2021 |
| KR | 10-2430493 | B1 | 8/2022 |

OTHER PUBLICATIONS

Office Action for KR10-2022-0082113 by Korean Intellectual Property Office dated Jan. 25, 2024.
Notice of Allowance for KR10-2023-0002909 by Korean Intellectual Property Office dated Jun. 25, 2024.

* cited by examiner

DEVICE FOR MANUFACTURING ELECTRODE

CROSS-REFERENCE TO RELATED APPLICATIONS

This application claims priority from Korean Patent Application No. 10-2022-0082113 filed in the Korean Intellectual Property Office on Jul. 4, 2022, Korean Patent Application No. 10-2022-0140555 filed in the Korean Intellectual Property Office on Oct. 27, 2022, and Korean Patent Application No. 10-2023-0002909 filed in the Korean Intellectual Property Office on Jan. 9, 2023, the disclosures of which are incorporated herein by reference.

BACKGROUND

1. Field of the Invention

The present disclosure relates to an electrode manufacturing device, and more specifically, to an electrode manufacturing device which performs an electrode notching process of forming an electrode tab by shearing a non-coated portion of an electrode of a secondary battery with a laser.

2. Discussion of Related Art

A notching system, which is one of the devices for manufacturing a secondary battery, is a device forming an electrode tab by shearing a non-coated portion of an electrode, and is composed of an unwinder which unwinds the electrode wound in a roll shape, a notching processing unit which shears a polymer electrode into an electrode shape using a press machine or laser notching device, and a visual inspection unit which inspects whether the processed polymer electrode is normally processed, a rewinder unit which rewinds the processed electrode into a roll shape, and the like.

In the notching processing unit, there is a method of forming electrode tabs at predetermined intervals by operating a punch in a downward direction to shear a non-coated portion on which an active material of an electrode is not applied in a predetermined shape after aligning unprocessed electrodes under the punch of a press machine, and a method of shearing the electrode tabs at predetermined intervals by emitting laser to the non-coated portion of the electrode from an upper side of the electrode.

Meanwhile, a foreign substance such as dust is generated during shearing or laser cutting, and when this foreign substance is accumulated around the electrode, a problem in that the electrode tabs are not properly cut can occur. Accordingly, it is important to remove the foreign substance around the electrode. However, in the case of an existing electrode manufacturing device, a shearing process is stopped while foreign substance is removed, and the shearing process is resumed after the foreign substance is removed. Accordingly, since the shearing process is stopped while the foreign substance is removed, there is a limitation in productivity.

SUMMARY OF THE INVENTION

The present disclosure is directed to providing an electrode manufacturing device with improved productivity as the downtime of notching processing for removing foreign substances is minimized.

The present disclosure is also directed to providing an electrode manufacturing device capable of quickly removing foreign substances while minimizing the shaking of an electrode.

However, problems to be solved by the present disclosure are not limited thereto, and may be variously expanded without departing from the spirit and the scope of the present disclosure.

According to one embodiment, there is provided an electrode manufacturing device including a transfer unit configured to transfer an electrode, a laser output unit configured to emit a laser beam to the electrode, a guide unit including a first surface and a second surface for guiding the electrode so that the electrode is transferred along a preset path while the laser beam is emitted, and a cleaning unit disposed adjacent to the guide unit, and configured to remove dust that is generated while the laser beam is emitted to the electrode and deposited on the guide unit, wherein the guide unit rotates between a first state and a second state, in the first state, the first surface is disposed to guide the electrode and the second surface is disposed to be cleaned by the cleaning unit, and in the second state, the first surface is disposed to be cleaned by the cleaning unit and the second surface is disposed to guide the electrode.

The electrode manufacturing device may further include a dust removing unit disposed adjacent to a region where the laser beam is emitted to the electrode to remove dust generated while the laser beam is emitted to the electrode, wherein the dust removing unit may include a first nozzle configured to spray a first fluid in a direction parallel to one surface of the electrode to which the laser beam is emitted, and a first suction hood configured to suction dust moved by the first fluid.

The first nozzle may include a plurality of spray holes disposed along a second direction perpendicular to the first direction.

The first suction hood may form a fluid flow around the one surface of the electrode in a direction parallel to the one surface of the electrode.

A speed of a fluid flow generated by the dust removing unit may be 15 m/s or more.

In the first state, the first surface may have a shape protruding to the outside of the guide so that a movement path of the electrode may have a protruding pattern around the first surface in a direction opposite a direction in which the laser beam is emitted.

The first surface may include a first portion whose surface is coated to improve surface hardness, and a second portion which is a porous plate through which a fluid sprayed by a nozzle located in the guide unit passes.

The first surface and the second surface may face each other.

The electrode may include a first region processed by the laser beam and on which an active material is not applied and a second region not processed by the laser beam and on which the active material is applied.

The electrode manufacturing device may further include a blocking unit for preventing dust generated when the laser beam is emitted to the first region from scattering to the second region.

The cleaning unit may remove dust deposited on the first surface or the second surface, according to a rotation state of the guide unit, and include a brush and a second suction hood.

The guide unit may include a second nozzle configured to spray a second fluid forming a fluid flow from the inside of the guide unit to the second suction hood.

The electrode manufacturing device may further include a scrap removing unit disposed under the guide unit, and configured to suction scrap falling due to gravity and discharge the scrap to the outside.

The guide unit may rotate 180° between the first state and the second state.

The electrode manufacturing device may further include an air knife configured to spray air so that the dust does not enter the laser output unit.

Embodiments different from the above-described embodiments will be described or become clear by the following detailed description for embodiments to be read in connection with the accompanying drawings.

BRIEF DESCRIPTION OF THE DRAWINGS

Aspects, features, and advantages of specific embodiments of the present disclosure will become more clear from the following description with reference to the accompanying drawings.

DETAILED DESCRIPTION OF THE PRESENT DISCLOSURE

Figure 1:
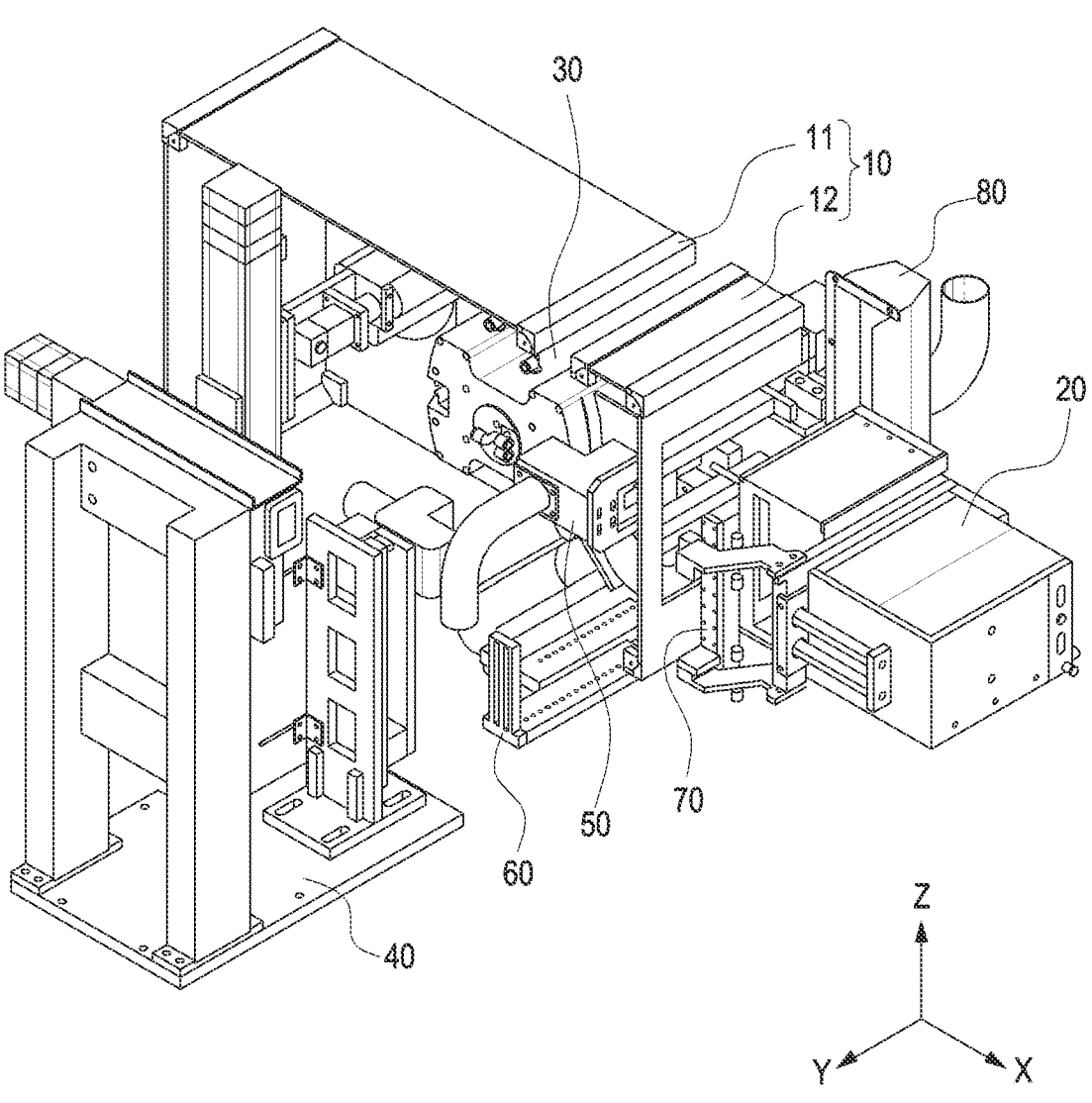
FIG. 1 is a perspective view of an electrode manufacturing device according to one embodiment of the present disclosure.

Terms used in the specification will be briefly described, and the present disclosure will be described in detail.

Currently and widely used general terms are selected as terms used in embodiments of the present disclosure as much as possible while considering the functions in the present disclosure, but may be changed according to the intention or precedent of those skilled in the art, the emergence of a new technology, and the like. Further, a specific case may also include terms arbitrarily selected by the applicant, and in this case, meanings will be described in detail in the description of the disclosure. Accordingly, the terms used in the present disclosure should be defined based on the meanings of the terms and the contents throughout the present disclosure, not simply the names of the terms.

Since the embodiments of the present disclosure may be variously changed and have various embodiments, specific embodiments will be exemplified in the drawings and described in the detailed description in detail. However, it should be understood that this is not intended to limit the scope to the specific embodiments, and includes all changes, equivalents, and substitutes included in the spirit and scope of the present disclosure. In the description of the embodiments disclosed in the specification, when it is determined that the detailed description of a related known technology may obscure the subject matter, the detailed description thereof will be omitted.

Terms such as first, second, and the like may be used to describe various components, but the components should not be limited by the above terms. The above terms are used only for the purpose of distinguishing one component from another.

A singular form also includes a plural form, unless the context clearly indicates otherwise. In the present application, it should be further understood that the terms "include," "including," "composed of" designate the presence of stated features, integers, steps, operations, elements, components, and/or a combination thereof, but do not preclude the presence or addition of one or more other features, integers, steps, operations, elements, components, and/or a combination thereof.

Embodiments of the present disclosure will be described below in detail with reference to the accompanying drawings which may allow one of ordinary skill in the art to easily carry out the present disclosure. However, the present disclosure may be implemented in various forms and is not limited to the following embodiments. Further, parts not related to the description are not included in the drawings to clearly describe the present disclosure, and like reference numerals are assigned to like parts throughout the specification.

Figure 2:
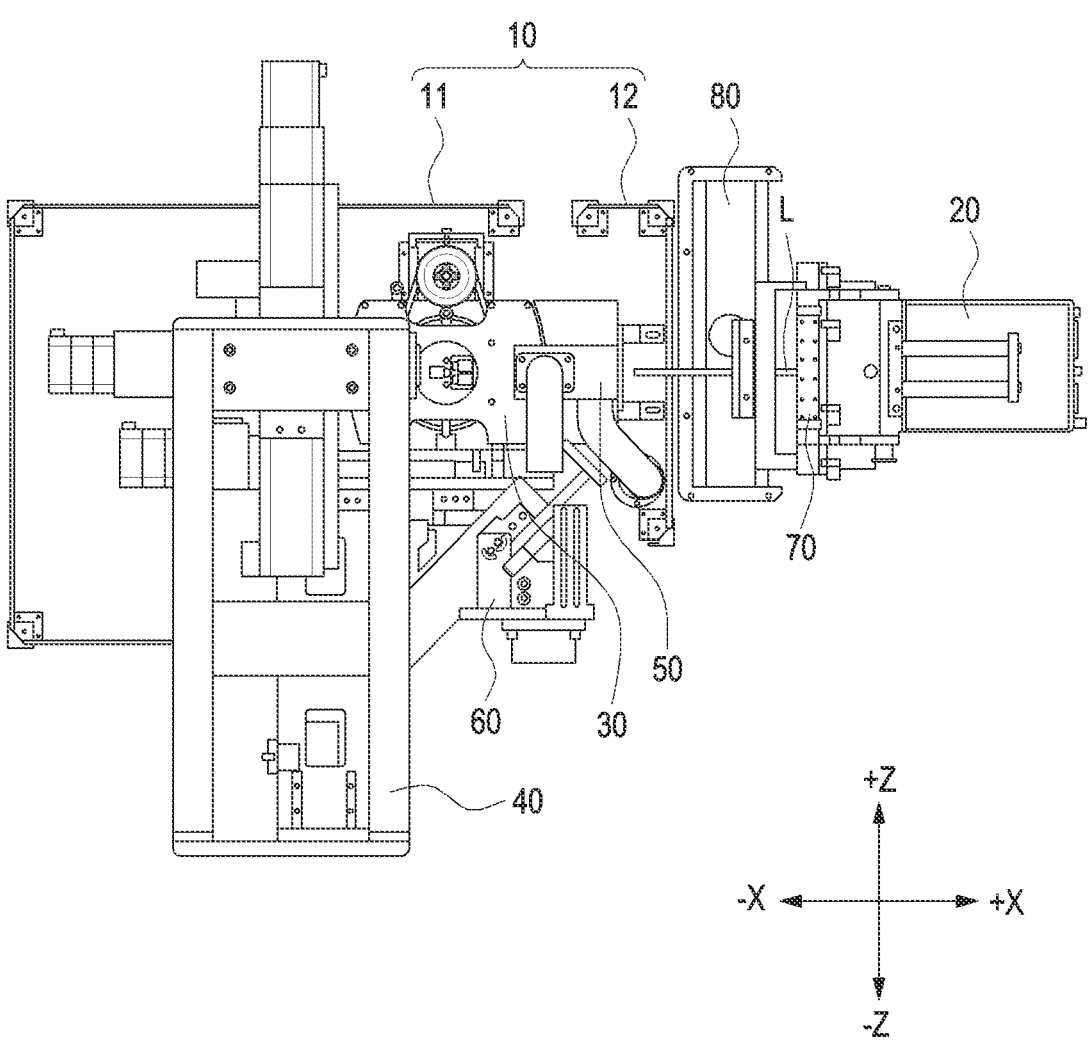
FIG. 2 is a plan view of the electrode manufacturing device according to one embodiment of the present disclosure.
Figure 3:
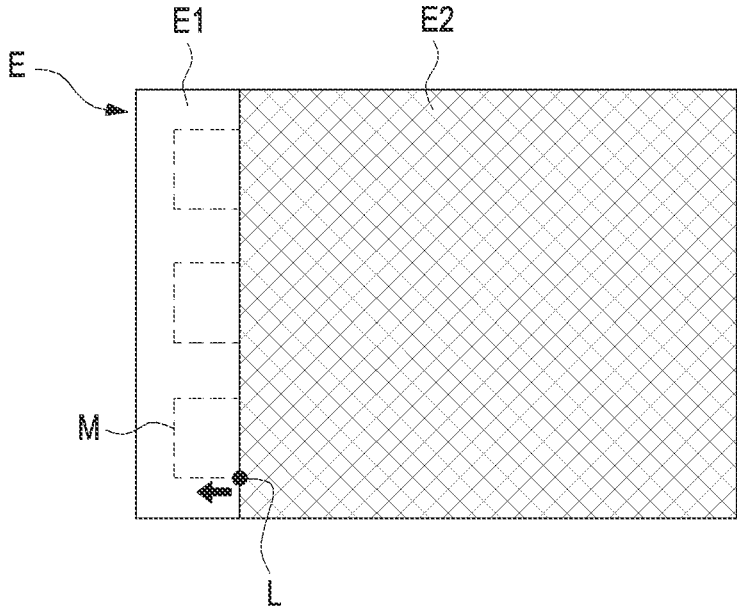
FIG. 3 is a schematic view of an electrode according to one embodiment of the present disclosure.

FIG. 1 is a perspective view of an electrode manufacturing device according to one embodiment of the present disclosure. FIG. 2 is a plan view of the electrode manufacturing device according to one embodiment of the present disclosure. FIG. 3 is a schematic view of an electrode according to one embodiment of the present disclosure.

Referring to FIGS. 1 to 3, an electrode manufacturing device 1 according to one embodiment may include a case 10, a laser output unit 20, a guide unit 30, a cleaning unit 40, a dust removing unit 50, a scrap removing unit 60, an air knife 70, a suction hood 80, and a transfer unit (not shown). In the present disclosure, an electrode E, which is a processing target, may include a metal current collector formed of a thin metal plate, and an active material may be applied on a partial region of the metal current collector. For example, the electrode E may include a first region E1 on which the active material is not applied and a second region E2 on which the active material is applied. The electrode E may have a sheet shape. The metal current collector may be a metal such as aluminum, and the active material may be a positive electrode active material or negative electrode active material used in a secondary battery, but other known materials may be used as the metal current collector or active material. The first region E1 may be referred to as a non-coated portion, and the second region E2 may be referred to as a coated portion.

The case 10 may be a means for preventing a laser beam emitted from the laser output unit 20 from being emitted to the outside. The case 10 may include a first member 11 and a second member 12. The electrode E may be transferred between the first member 11 and the second member 12 by the transfer unit.

The transfer unit serves to support the electrode E so that the electrode E is transferred. In one embodiment, the transfer unit may be located in a +z-axis direction from the case 10. The transfer unit may transfer the electrode E between the first member 11 and the second member 12 along a −z-axis direction. The transfer unit serves to guide and support the electrode E between a supply unit and a recovery unit which are not shown, and may include a plurality of wheels or rollers for this role. For example, the transfer unit may transfer sheet-shaped electrodes E continuously supplied by the supply unit and the recovery unit so that laser notching processing may be performed in a state in which the sheet-shaped electrodes E are accurately seated at processing positions. For example, the transfer unit may intermittently supply/recover the electrodes E between the supply unit and the recovery unit.

The laser output unit 20 outputs and emits a laser beam L for cutting the electrode E. The laser output unit 20 according to an example may emit the laser beam L along a direction (for example, −x direction) perpendicular to one plane of the electrode E. The laser output unit 20 may emit the laser beam L to the first region E1 of the electrode E. The laser output unit 20 may cut a portion of the first region E1 of the electrode E by moving the laser beam L along a predetermined line M to be cut. Meanwhile, in FIG. 3, a shape of the line M to be cut is shown in a quadrangular shape, but this is only one embodiment, and the shape of the line M to be cut is not limited thereto. For example, the shape of the line M to be cut may be a triangular shape or may include a curved line.

The laser output unit 20 may include a mirror, a lens, and/or a scanner for forming a path of the laser beam L. The laser output unit 20 may include a camera for monitoring a region processed by the laser beam L.

The guide unit 30 may guide the electrode E moving along the direction of gravity (−z direction) while the notching processing by the laser beam L is performed. The guide unit 30 according to an example may support the electrode E so that the electrode E may move accurately along a preset path without interfering with the movement of the continuously moving electrode E. The guide unit 30 may support the electrode E in a non-contact manner. Accordingly, adsorption and friction between the guide unit 30 and the electrode E may be prevented.

The guide unit 30 may include at least two surfaces capable of guiding the electrode E. For example, the guide unit 30 may include a first surface and a second surface. The first surface may be disposed to face a first direction (+x direction) to face the electrode E transferred in the −z direction. The notching processing by the laser beam L may be performed while the first surface supports the electrode E. In this case, the second surface may be disposed to face a second direction (−x direction). The second surface may be cleaned by the cleaning unit 40. For example. the cleaning unit 40 may remove the dust which is present around the guide unit 30.

When the notching processing for a predetermined amount of electrodes E is completed, the guide unit 30 may rotate. Accordingly, positions of the first surface and the second surface may be switched. That is, the first surface may be disposed adjacent to the cleaning unit 40 and cleaned by the cleaning unit 40. In this case, the cleaning unit 40 may remove the dust which is generated during the notching processing and present around the first surface. The second surface may be disposed to face the first direction (+x direction) to face the electrode E transferred in the −z direction. The second surface supports the electrode E, and the notching processing by the laser beam L may be performed.

Like the above, as the guide unit 30 rotates, one surface of the first surface and the second surface may support the electrode E to be processed, and the other surface may be cleaned by the cleaning unit 40. That is, processing of the electrode E and cleaning by the cleaning unit 40 may be simultaneously performed. Since a conventional electrode manufacturing device includes only one support surface, notching processing should be stopped to remove dust generated during the notching processing after the notching processing has been performed for a predetermined time or more. On the other hand, since the electrode manufacturing device 1 according to the present disclosure includes a plurality of guide surfaces and rotates, and thus the cleaning and the notching processing for the guide surfaces may be simultaneously performed, continuity of the processing may be ensured and processing efficiency may be improved. More details related to the guide unit 30 will be described below with reference to FIGS. 4 to 6.

The cleaning unit 40 may remove dust generated in a process of notching and cutting the electrode E using the laser beam L. Specifically, the cleaning unit 40 may remove the dust around the guide unit 30. The cleaning unit 40 may remove dust deposited on a surface other than the surface of the guide unit 30 which supports the electrode E being processed. For example, the dust has a width of 0.02 mm or less, and may be a foreign substance which floats around the electrode E. However, the present disclosure is not limited thereto, and any foreign substance (for example, fumes) generated in the process of notching and cutting the electrode E using the laser beam L or disposed around the electrode E may also be defined as dust.

The dust removing unit 50 may suction and remove the dust generated in the process of notching and cutting the electrode E using the laser beam L. Specifically, the dust removing unit 50 may remove the dust around the surface of the guide unit 30 which supports the electrode E being processed. The dust removing unit 50 and the cleaning unit 40 may be simultaneously driven. For example, the cleaning unit 40 may clean the periphery of the second surface of the guide unit 30 while the dust removing unit 50 removes dust around the first surface of the guide unit 30 which supports the electrode E.

The scrap removing unit 60 may separate and discharge scrap generated in the process of notching and cutting. For example, the scrap may be a foreign substance having a width greater than 0.02 mm and separated from the electrode E. However, the present disclosure is not limited thereto, and in the process of notching and cutting the electrode E using the laser beam L, any foreign substance, which falls due to gravity, may be defined as scrap. In one embodiment, the scrap removing unit 60 may include an air nozzle or orifice which separates scrap from a fluid. Further, the scrap removing unit 60 may include a suction hood which suctions and removes the separated scrap.

The air knife 70 and the suction hood 80 may be configurations for preventing foreign substances from entering the laser output unit 20. The air knife 70 may spray air in a preset direction (for example, −y direction). The suction hood 80 may suction foreign substances which move according to the air flow formed by the air knife 70. Accordingly, a problem caused by the introduction of foreign substances into the laser output unit 20 (for example, a decrease in intensity of the laser beam L emitted to the electrode E) may be prevented.

A nozzle 51 included in the dust removing unit 50 may be disposed between the laser output unit 20 and the guide unit 30. The nozzle 51 may spray a fluid in a direction parallel to one surface of the electrode E to which the laser beam L is emitted (y direction). The nozzle 51 may include a plurality of holes H disposed along the z-axis direction.

Meanwhile, the electrode manufacturing device 1 may include a blocking unit 92 for preventing dust generated when the laser beam L is emitted to the first region E1 of the electrode E from scattering to the second region E2.

Figure 4:
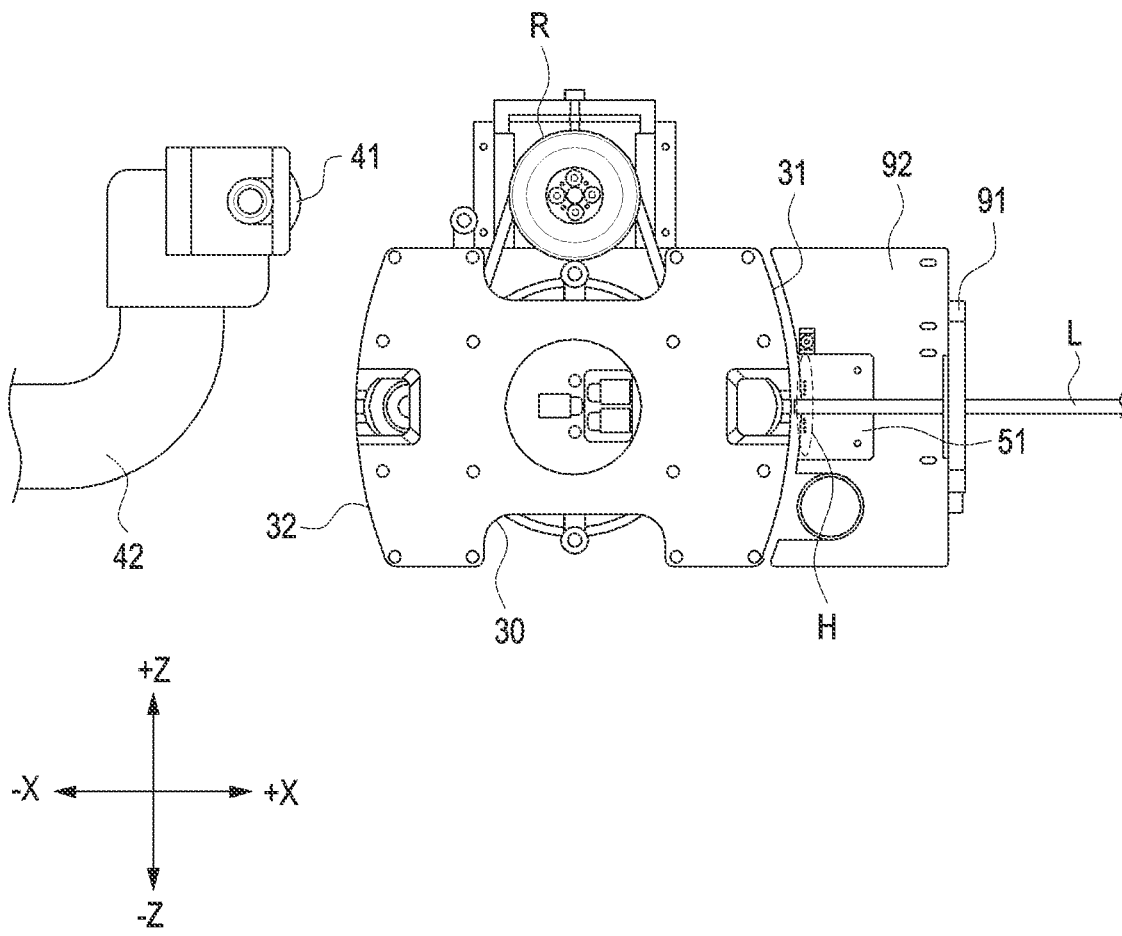
FIG. 4 is a partial perspective view of the electrode manufacturing device according to one embodiment of the present disclosure.
Figure 5:
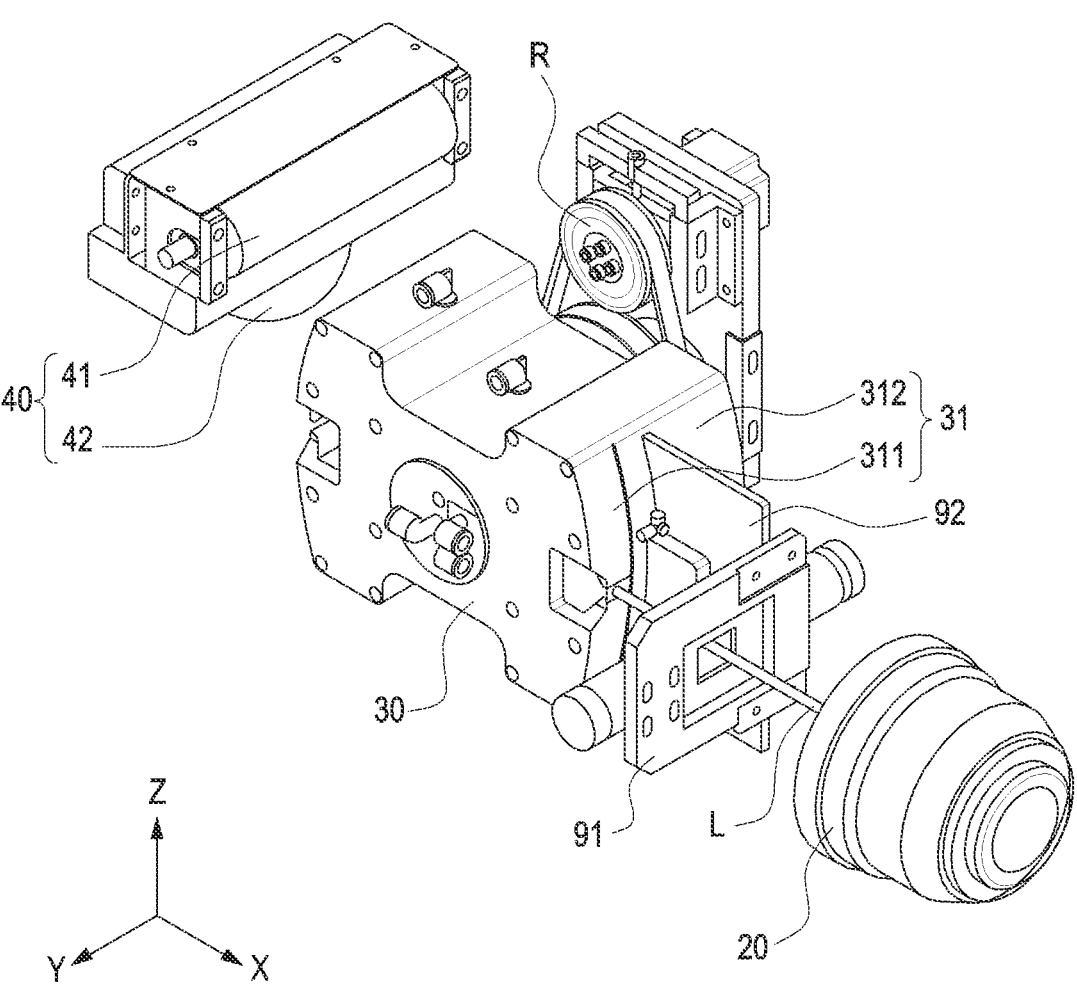
FIG. 5 is a partial plan view of the electrode manufacturing device according to one embodiment of the present disclosure.

FIG. 4 is a partial perspective view of the electrode manufacturing device according to one embodiment of the present disclosure. FIG. 5 is a partial plan view of the electrode manufacturing device according to one embodiment of the present disclosure.

Referring to FIGS. 4 and 5, the guide unit 30 may include a first surface 31 and a second surface 32. Each of the first surface 31 and the second surface 32 may have a curved shape having a predetermined curvature. The first surface 31 may include a first portion 311 and a second portion 312. The first portion 311 may be located to correspond to the first region E1 of the electrode E, and the second portion 312 may be located to correspond to the second region E2 of the electrode E. The first region E1 of the electrode E may be transferred while facing the first portion 311, and the second region E2 of the electrode E may be transferred while facing the second portion 312.

The first portion 311 may include a hole through which the laser beam L may pass. The laser beam L passing through the hole of the first portion 311 may be input to a beam dump provided in the guide unit 30. In one embodiment, a surface of the first portion 311 may be coated so that the surface hardness thereof may increase. The second portion 312 may be a porous plate. A nozzle provided in the guide unit 30 may spray a pressurized fluid toward the second portion 312. Accordingly, the electrode E may be supported by the second portion 312 without coming into contact with the guide unit 30. The pressurized fluid may be clean dry air (CDA), but the present disclosure is not limited thereto. Any fluid which applies pressure to the electrode E may be used as the pressurized fluid.

The pressurized fluid sprayed by the guide unit 30 may apply a predetermined pressure to the second region E2 of the electrode E along the +x direction. As the predetermined pressure is applied to the second region E2 of the electrode E, the sheet-shaped electrode E may be changed to a curved shape having a predetermined curvature.

According to one embodiment, as the shape of the electrode E is changed to the curved shape having a predetermined curvature, the shaking of the electrode E supported in a non-contact manner may decrease. However, when the sheet-shaped electrode E is changed to a curved shape beyond a critical curvature, an error may occur in a focal region of the laser beam L output from the laser output unit 20. Accordingly, the pressure of the pressurized fluid sprayed from the guide unit 30 may be set to a range in which the sheet-shaped electrode E is not deformed beyond the critical curvature. For example, when the pressure of the pressurized fluid is 0.3 Mpa, the electrode E may have a critical curvature, and when the pressure of the pressurized fluid exceeds 0.3 Mpa, the curvature of the electrode E may exceed the critical curvature. In this case, the pressure of the pressurized fluid may be set to 0.3 Mpa or less. Meanwhile, the critical curvature of the electrode E and a critical pressure of the pressurized fluid corresponding to the critical curvature may be predetermined based on experiments.

For example, a first curvature of the first surface 31 may be designed to be less than the critical curvature of the electrode E supported by the guide unit 30. In this case, the pressure of the pressurized fluid applied to the second region E2 by the nozzle located in the guide unit 30 may be adjusted so that the curvature of the electrode E, which changes to the curved shape, may correspond to the first curvature of the first surface 31.

Although detailed descriptions are omitted for convenience of description, the second surface 32 may include a portion facing the first region E1 and whose surface is coated, and a portion, which is a porous plate and faces the second region E2, like the first surface 31.

The guide unit 30 is rotatable by a roller R, and positions of the first surface 31 and the second surface 32 may be switched according to rotation. In one embodiment, the roller R may rotate the guide unit 30 180°. Meanwhile, the roller R may rotate the guide unit 30 in a first state and a second state. Here, the first state may refer to a state before the guide unit 30 is rotated based on an arbitrary time interval, and the second state may refer to a state after the guide unit 30 is rotated. For convenience of description, FIGS. 4 and 5 show the guide unit 30 in the first state. In the second state, the positions of the first surface 31 and the second surface 32 are changed differently from those shown in FIGS. 4 and 5.

Meanwhile, a transition between the first state and the second state may occur according to whether a preset condition is satisfied. In one embodiment, the preset condition may include a condition in which the notching processing for a preset amount of electrodes E is completed or a condition in which the dust present around the first surface 31 is greater than or equal to a preset amount. For example, when the notching processing for the preset amount of electrodes E is completed in the first state, a transition to the second state may occur. Accordingly, the transition between the first state and the second state repeatedly occurs while the notching processing for the electrode E is performed, and accordingly, the positions of the first surface 31 and the second surface 32 may be repeatedly switched.

In the first state, the electrode E may move in the −z direction from a position spaced apart from the first surface 31 by a preset distance in the +x direction. The notching processing for the first region E1 of the electrode E may be performed by the laser beam L output from the laser output unit 20 while the electrode E moves. In one embodiment, the laser beam L may be emitted to the electrode E after passing through a jig 91. The jig 91 may be disposed between the guide unit 30 and the laser output unit 20 to prevent the dust generated by the notching processing from entering the laser output unit 20.

While the first surface 31 supports the electrode E, the second surface 32 may be cleaned by a brush 41 and a suction hood 42 included in the cleaning unit 40. As will be described below, the cleaning unit 40 may further include another suction hood disposed adjacent to the guide unit 30 to suction dust.

When the guide unit 30 is rotated 180° when the preset condition is satisfied, the first surface 31 may be disposed adjacent to the cleaning unit 40 and cleaned by the cleaning unit 40. The second surface 32 may be disposed to face the electrode E to support the electrode E, and the notching processing for the electrode E by the laser beam L may be performed.

In the case of the conventional electrode manufacturing device, a shearing process should be stopped while the dust generated when the electrode is processed is removed, and the shearing process should be resumed after dust removal was completed. On the other hand, in the electrode manufacturing device 1 of the present disclosure, while a shearing process is performed on one surface of the guide unit 30, a dust cleaning operation may be performed on the other surface. When the shearing process for the predetermined amount of electrodes E is completed, since the surface cleaned according to the rotation of the guide unit 30 supports the electrodes E, the shearing process may be immediately performed. Accordingly, the electrode manufacturing device 1 of the present disclosure has an advantage in that productivity is higher compared to the conventional electrode manufacturing device.

Figure 6:
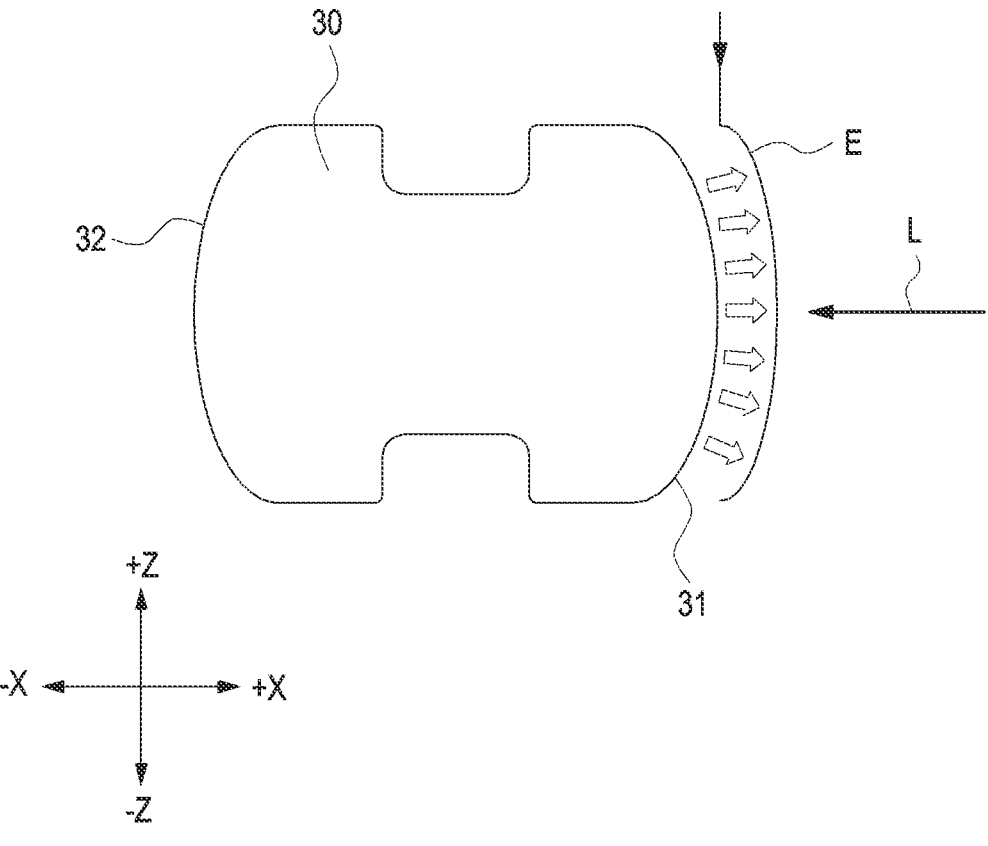
FIG. 6 is a partial schematic view of the electrode manufacturing device according to one embodiment of the present disclosure.

FIG. 6 is a partial schematic view of the electrode manufacturing device according to one embodiment of the present disclosure.

Referring to FIG. 6, each of the first surface 31 and the second surface 32 of the guide unit 30 may have a shape protruding to the outside of the guide unit 30. Each of the first surface 31 and the second surface 32 may have a curved shape having a predetermined curvature. Accordingly, a movement path of the electrode E around the first surface 31 may protrude in a direction (+x direction) opposite the direction in which the laser beam L is emitted (−x direction). That is, the electrode E may protrude in the direction opposite the direction in which the laser beam L is emitted when supported by the first surface 31. The electrode E may have a convex curved shape in the +x direction in a region supported by the first surface 31. The first surface 31 and the second surface 32 may have the same curvature. In another embodiment, the first surface 31 and the second surface 32 may have different curvatures.

Meanwhile, in the process of processing the electrode E using the laser beam L, when the shaking of the electrode E is excessive, a focal position of the laser beam L becomes inaccurate and thus the electrode E may not be properly cut. Since the guide unit 30 of the present disclosure has a shape protruding in the direction opposite the emission direction of the laser beam L, the electrode E supported by the guide unit 30 may also protrude in the direction opposite the emission direction of the laser beam L. When the electrode E protrudes in the direction opposite the emission direction of the laser beam L, the shaking of the electrode E by the laser beam L may decrease. Accordingly, the guide unit 30 of the present disclosure may alleviate the shaking of the electrode E by the laser beam L to decrease product defects.

Meanwhile, in the present disclosure, although an example in which the guide unit 30 has two guide surfaces is described, the present disclosure is not limited thereto, and the guide unit 30 may have two or more guide surfaces. For example, the guide unit 30 may have four guide surfaces. In this case, the guide unit 30 may rotate 90° every time the state transitions, and the surfaces of the guide unit 30 may alternately support the electrode E.

Figure 7:
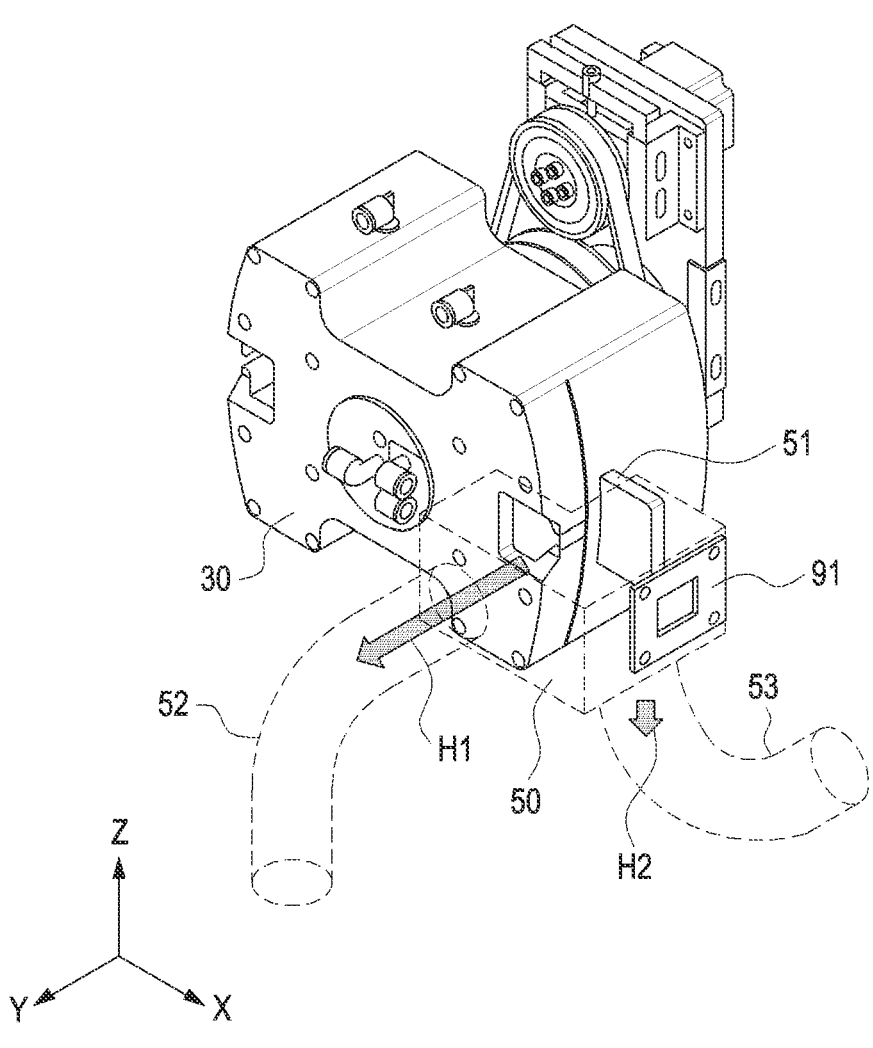
FIG. 7 is a partial perspective view of the electrode manufacturing device according to the present disclosure.

FIG. 7 is a partial perspective view of the electrode manufacturing device according to the present disclosure.

Referring to FIGS. 6 and 7, the dust removing unit 50 may include the nozzle 51 which sprays a fluid in a direction parallel to the electrode E. The nozzle 51 may spray the fluid in a direction (y direction) parallel to a processing surface of the electrode E to which the laser beam L is emitted. The dust generated while the electrode E is cut by the laser beam L may be moved by the fluid sprayed from the nozzle 51. The dust removing unit 50 may include a first suction hood 52 and a second suction hood 53, which suction fluid flows H1 and H2 formed by the nozzle 51. The first suction hood 52 and the second suction hood 53 may suction the dust moved by the fluid sprayed by the nozzle 51. Specifically, the first suction hood 52 may suction dust in the direction (y direction) parallel to the processing surface of the electrode E.

Meanwhile, the shaking of the electrode E may occur according to the arrangement of the nozzle 51 or the suction hoods 52 and 53 for dust removal. For example, when the nozzle 51 sprays a fluid in a direction (−x direction) perpendicular to the processing surface of the electrode E, the focal position of the laser beam L may become inaccurate due to excessive shaking of the electrode E. The nozzle 51 according to the present disclosure is disposed to spray a fluid in a direction (y direction) parallel to the processing surface of the electrode E, and the first suction hood 52 may be disposed to suction dust in a direction (y direction) parallel to the processing surface of the electrode E. Accordingly, the shaking of the electrode E may be minimized, and dust may be quickly removed by forming a high-speed fluid flow. For example, a speed of a fluid flow inside the dust removing unit 50 may be 15 m/s or more. Since the speed of the fluid flow is greater than a speed of a fluid flow used in the conventional electrode manufacturing device, interference with the laser beam L, which may be caused by dust or scrap, may be minimized.

Meanwhile, although not shown in FIG. 7, the electrode E may be transferred between the guide unit 30 and the nozzle 51.

Figure 8:
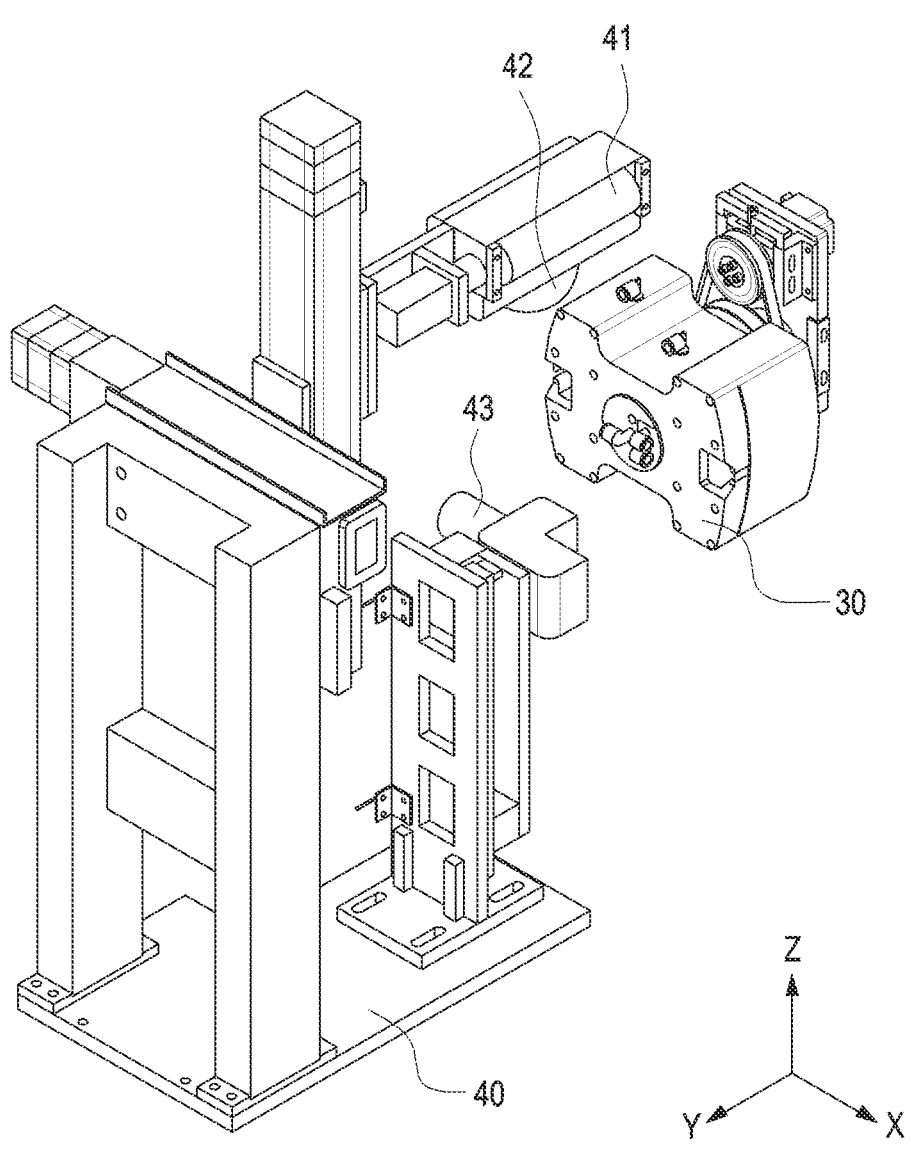
FIG. 8 is a partial perspective view of the electrode manufacturing device according to one embodiment of the present disclosure.
Figure 9:
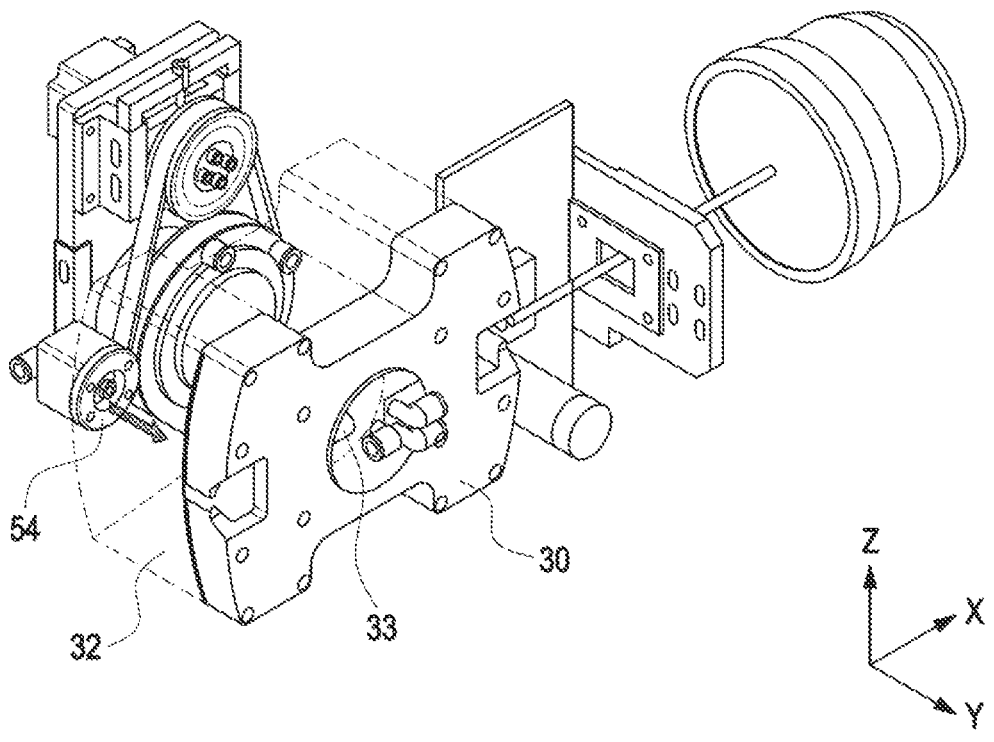
FIG. 9 is a partial perspective view of the electrode manufacturing device according to one embodiment of the present disclosure.

FIG. 8 is a partial perspective view of the electrode manufacturing device according to one embodiment of the present disclosure. FIG. 9 is a partial perspective view of the electrode manufacturing device according to one embodiment of the present disclosure.

Referring to FIGS. 8 and 9, the cleaning unit 40 may include the brush 41 and suction hoods 42 and 43. In one embodiment, the suction hood 43 may be disposed adjacent to the second surface 32 of the guide unit 30 to remove dust around the second surface 32. The suction hood 43 may suction a fluid flow formed by a fluid sprayed by a nozzle 33 located inside the guide unit 30 and a nozzle 54 located outside the guide unit 30. The nozzle 33 may spray the fluid in the −x direction, and the nozzle 54 may spray the fluid in the +y direction.

The suction hood 43 may operate at a different timing from the brush 41 and the suction hood 42. For example, after the suction hood 43 removes dust around the second surface 32, the brush 41 and the suction hood 42 may clean the second surface 32. Alternatively, after the brush 41 and the suction hood 42 clean the second surface 32, the suction hood 43 may remove dust around the second surface 32. The suction hood 43 may move in the z-axis direction by a cylinder. For example, the suction hood 43 may move in the +z direction to a height corresponding to the nozzle 54 to remove the dust around the second surface 32, and may move in the −z direction when the dust removing operation is completed. Thereafter, the brush 41 and the suction hood 42 may approach the second surface 32 in the +x direction to clean the second surface 32. When the cleaning operation is completed, the brush 41 and the suction hood 42 may move in the −x direction.

The disclosed technology may have the following effects. However, since a specific embodiment need not include all of the following effects or only the following effects, it should not be understood that the scope of the disclosed technology is limited by the above.

According to one embodiment of the present disclosure, an electrode manufacturing device can improve productivity by minimizing the downtime of notching processing for removing foreign substances.

According to one embodiment of the present disclosure, the electrode manufacturing device can improve notching processing accuracy by quickly removing foreign substances while minimizing the shaking of an electrode.

The above-described content of the present disclosure does not include a complete list of all aspects of the present disclosure. It should be understood that the present disclosure includes all methods, devices, and systems that can be embodied from all appropriate combinations of the various aspects disclosed in the following detailed description and the claims, as well as items which are summarized above. In addition, effects that may be acquired or predicted due to the embodiments of the present disclosure will be directly or implicitly disclosed in the detailed description for the embodiment of the present disclosure. For example, various effects predicted according to the embodiment of the present disclosure will be disclosed within the above detailed description.

Although preferable embodiments of the present disclosure have been described above, the present disclosure is not limited to the above-described specific embodiments, various modifications are possible by those skilled in the art without departing from the principle of the present disclosure claimed in the claims, and these modifications should not be individually understood from the technical spirit or prospective of the present disclosure.

What is claimed is:

1. An electrode manufacturing device comprising:
a transfer unit configured to transfer an electrode;
a laser output unit configured to emit a laser beam to the electrode;
a guide unit including a first surface and a second surface for guiding the electrode so that the electrode is transferred along a preset path while the laser beam is emitted; and
a cleaning unit disposed adjacent to the guide unit, and configured to remove dust generated while the laser beam is emitted to the electrode and deposited on the guide unit,
wherein the guide unit rotates between a first state and a second state,
in the first state, the first surface is disposed to guide the electrode and the second surface is disposed to be cleaned by the cleaning unit, and
in the second state, the first surface is disposed to be cleaned by the cleaning unit and the second surface is disposed to guide the electrode.

2. The electrode manufacturing device of claim 1, further comprising a dust removing unit disposed adjacent to a region where the laser beam is emitted to the electrode to remove dust generated while the laser beam is emitted to the electrode,
wherein the dust removing unit includes a first nozzle configured to spray a first fluid in a direction parallel to one surface of the electrode to which the laser beam is emitted, and a first suction hood configured to suction dust moved by the first fluid.

3. The electrode manufacturing device of claim 2, wherein the first nozzle includes a plurality of spray holes disposed along a second direction perpendicular to the first direction.

4. The electrode manufacturing device of claim 2, wherein the first suction hood forms a fluid flow around the one surface of the electrode in a direction parallel to the one surface of the electrode.

5. The electrode manufacturing device of claim 2, wherein a speed of a fluid flow generated by the dust removing unit is 15 m/s or more.

6. The electrode manufacturing device of claim 1, wherein in the first state, the first surface has a shape protruding to the outside of the guide so that a movement path of the electrode has a protruding pattern around the first surface in a direction opposite a direction in which the laser beam is emitted.

7. The electrode manufacturing device of claim 1, wherein the first surface includes a first portion whose surface is coated to improve surface hardness, and a second portion which is a porous plate through which a fluid sprayed by a nozzle located in the guide unit passes.

8. The electrode manufacturing device of claim 1, wherein the first surface and the second surface face each other.

9. The electrode manufacturing device of claim 1, wherein the electrode includes a first region processed by the laser beam and on which an active material is not applied and a second region not processed by the laser beam and on which the active material is applied.

10. The electrode manufacturing device of claim 9, further comprising a blocking unit for preventing dust generated when the laser beam is emitted to the first region from scattering to the second region.

11. The electrode manufacturing device of claim 1, wherein the cleaning unit removes dust deposited on the first surface or the second surface according to a rotation state of the guide unit, and includes a brush and a second suction hood.

12. The electrode manufacturing device of claim 11, wherein the guide unit includes a second nozzle configured to spray a second fluid forming a fluid flow from the inside of the guide unit to the second suction hood.

13. The electrode manufacturing device of claim 1, further comprising a scrap removing unit disposed under the guide unit, and configured to suction scrap falling due to gravity and discharge the scrap to the outside.

14. The electrode manufacturing device of claim 1, wherein the guide unit rotates 180° between the first state and the second state.

15. The electrode manufacturing device of claim 1, further comprising an air knife configured to spray air so that the dust does not enter the laser output unit.

16. The electrode manufacturing device of claim 1, wherein the first surface has a curved shape having a first curvature smaller than a predetermined critical curvature.

17. The electrode manufacturing device of claim 1, wherein the first surface and the second surface have the same curvature.

18. The electrode manufacturing device of claim 16, wherein the guide unit includes a third nozzle configured to spray a pressurized fluid to the electrode, and
a pressure of the pressurized fluid is set to a range in which the electrode is not deformed beyond the predetermined critical curvature.

* * * * *